(12) United States Patent  (10) Patent No.: US 8,756,572 B2
Halliday et al.  (45) Date of Patent: Jun. 17, 2014

(54) DEBUGGER-SET IDENTIFYING BREAKPOINTS AFTER COROUTINE YIELD POINTS

(75) Inventors: Ian W. J. Halliday, Seattle, WA (US); Gregory B. Miskelly, Seattle, WA (US); Stephen H. Toub, Seattle, WA (US); Dmitry Lomov, Redmond, WA (US); Kayle K. Hinkle, III, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 150 days.

(21) Appl. No.: 13/053,228

(22) Filed: Mar. 22, 2011

(65) Prior Publication Data

US 2012/0246624 A1 Sep. 27, 2012

(51) Int. Cl.
*G06F 9/44* (2006.01)
(52) U.S. Cl.
USPC ............ 717/124; 717/104; 717/128; 717/129
(58) Field of Classification Search
CPC ... G06F 11/36; G06F 11/362; G06F 11/3656; G06F 11/3672
USPC .................. 717/104, 124, 128, 129
See application file for complete search history.

(56) References Cited

U.S. PATENT DOCUMENTS

| | | | |
|---|---|---|---|
| 5,748,963 A | 5/1998 | Orr | |
| 5,815,653 A | 9/1998 | You et al. | |
| 6,353,923 B1 | 3/2002 | Bogle et al. | |
| 6,412,106 B1 * | 6/2002 | Leask et al. | 717/124 |
| 7,401,323 B2 | 7/2008 | Stall et al. | |
| 7,836,430 B2 | 11/2010 | Shebs | |
| 8,019,075 B2 | 9/2011 | Mohammad et al. | |
| 8,079,019 B2 | 12/2011 | Lindo et al. | |
| 2004/0168155 A1 * | 8/2004 | O'Farrell et al. | 717/129 |
| 2004/0205720 A1 | 10/2004 | Hundt | |
| 2005/0034024 A1 * | 2/2005 | Alverson et al. | 714/38 |
| 2008/0052683 A1 | 2/2008 | Bates et al. | |

(Continued)

OTHER PUBLICATIONS

Fernadez, et al., "Ddbx-LPP: A Dynamic Software Tool for Debugging Asynchronous Distributed Algorithms on Loosely- Coupled Parallel Processors", Retrieved at<< http://ieeexplore.ieee.org/stamp/stamp.jsp?arnumber=00169757>>,1991, pp. 639-644.

(Continued)

*Primary Examiner* — Don Wong
*Assistant Examiner* — Mohammad Kabir
(74) *Attorney, Agent, or Firm* — Kevin Sullivan; Kate Drakos; Micky Minhas (57) ABSTRACT

A debugger can step through target code in a computer program. The debugger can identify a coroutine yield point in the target code, and can obtain identifying information to identify continued processing of a coroutine instance triggered by the operator. The debugger can set a breakpoint at a location for continued stepping after the coroutine yield point. The breakpoint can have a condition of matching the identifying information with runtime information. The debugger can perform the coroutine instance and resume execution of the target code after the coroutine yield point. The debugger can also encounter the breakpoint in the target code, and can determine whether the condition of the breakpoint is met. If so, the debugger can pause execution of the target code at the breakpoint. If not, the debugger can continue execution of the target code past the breakpoint without pausing at the breakpoint.

20 Claims, 4 Drawing Sheets

(56) References Cited

U.S. PATENT DOCUMENTS

| | | | |
|---|---|---|---|
| 2009/0125890 A1 | 5/2009 | Bennet et al. | |
| 2009/0133033 A1 | 5/2009 | Lindo et al. | |
| 2009/0307652 A1* | 12/2009 | Maybee et al. | 717/104 |
| 2010/0131745 A1 | 5/2010 | Meijer et al. | |
| 2010/0153927 A1* | 6/2010 | Stall et al. | 717/128 |
| 2010/0313184 A1 | 12/2010 | Gustafsson et al. | |
| 2011/0302454 A1 | 12/2011 | Prophete et al. | |
| 2012/0047495 A1* | 2/2012 | Meijer et al. | 717/140 |
| 2012/0151452 A1* | 6/2012 | Zinkovsky et al. | 717/129 |
| 2012/0266144 A1 | 10/2012 | Halliday et al. | |
| 2012/0324431 A1 | 12/2012 | Toub et al. | |

OTHER PUBLICATIONS

Mitrovic, Vladimir, "Testing Asynchronous Code With GHUnit", Retrieved at<< http://vladimir.zardina.org/2010/11/testing-asynchronous-code-with-ghunit/>>, Nov. 20, 2010, pp. 4.

Satyam, "Ask Satyam: Writing Clean, Debuggable Code", Retrieved at<<http://www.yuiblog.com/blog/2010/09/02/ask-satyam-writing-clean-code/>>, Sep. 2, 2010, pp. 14.

Baechtel, Don, "What changes in debugging Async code", Retrieved at<< http://social.msdn.microsoft.com/Forums/en-US/async/thread/9d6508a5-bd0f-40df-93a3-49ddd69e5a39/>>, Nov. 2010, pp. 5.

Griffiths, Ian, "C# 5 Async Exception Handling", Retrieved at<<http://www.interact-sw.co.uk/iangblog/2010/11/01/csharp5-async-exceptions>>, Nov. 1, 2010, pp. 5.

Halliday, "What changes in debugging Async code?" Microsoft Visual Studio Blog, Last Reply Nov. 15, 2010, 5 pages.

Rossi, "ABAP Debugger", SAP Community Network Blog, Last Edited May 28, 2010, 2 pages.

Vijayvargiya, "Writing Windows Debugger—Part 2," The Code Project, Last Updated Dec. 26, 2010, 34 pages.

Allen, "Visual Studio Debugging Tutorial," Dot Net Perls, Last Post Shown Dec. 8, 2010, 8 pages.

"Visual Studio 2010: Understanding Debugging," Programming 4Us, Oct. 13, 2010, 9 pages.

Toub, "Processing Sequences of Asynchronous Operations with Tasks", Nov. 21, 2010, 6 pages.

Lippert, Eric, "Asynchronous Programming in C# 5.0 Part Two: Whence Await?", Last Post Shown Oct. 30, 2010, 5 pages.

Moise, Wesner, Smart Software, "Building Iterators Using Asynchronous Methods", Nov. 2, 2010, 4 pages.

Sur, Abhishek, "C# 5.0 vNext-New Asynchronous Pattern", Last Updated Nov. 20, 2010, 25 pages.

Juday, Jeffrey, "Awaiting Future C# Asynchronous Features Brought to You by .NET Parallel Computing", Dec. 7, 2010, 6 pages.

Toub, "Implementing the Asynchronous Programming Model With Future <T>", Last Post Apr. 14, 2008, 4 pages.

Matveev, Vladimir, "Event-Based Async Pattern in F#", 2010, 3 pages.

Krohn, Maxwell, et al., "Events Can Make Sense", Based on information and belief available, at least as early as Dec. 29, 2010, 14 pages.

Office Action, U.S. Appl. No. 13/162,288, filed Jun. 16, 2011, Notification Date: Oct. 9, 2013, 13 Pages.

Office Action, U.S. Appl. No. 13/088,003, filed Apr. 15, 2011, Notification Date: Jan. 6, 2014, 31 Pages.

Office Action, U.S. Appl. No. 13/088,003, filed Apr. 15, 2011, Notification Date: Jul. 5, 2013, 20 Pages.

* cited by examiner

DEBUGGER-SET IDENTIFYING BREAKPOINTS AFTER COROUTINE YIELD POINTS

BACKGROUND

When debugging code, a debugger steps through the code to be debugged by executing (typically via a runtime environment) the code and pausing the execution of the code at the end of each "step". This pausing can allow analysis of the runtime environment, and it can also allow other actions such as user input to provide direction via user input.

Debuggers can step through asynchronous code (e.g., asynchronous workflows in the Visual F# language and asynchronous methods in the Visual C#® and Visual Basic® languages), such as an "asynchronous wait" operator in target code, which triggers an asynchronous wait operation. An asynchronous wait operation suspends execution of the target code (e.g., by signing up a callback to be invoked upon the completion of some asynchronous operation) and then returns to the target code's caller. Later, (e.g., when the callback is invoked) processing of the asynchronous operation is continued in the target code. Execution of such an asynchronous wait operation causes a typical debugger to follow the physical execution and continue stepping in the caller.

SUMMARY

In some situations, it can be desirable to have debugger stepping behavior such that encountering a coroutine yield point, such as an asynchronous wait operator, will cause the debugger to wait for the coroutine to complete and continue stepping in the code following the yield point. According to the tools and techniques described herein, a debugger can set an identifying breakpoint at a location for continued processing after a coroutine yield point. The identifying breakpoint is a conditional breakpoint with a condition of matching identifying information for a coroutine instance such as an asynchronous wait operation instance. The debugger can proceed with executing the coroutine instance, and can pause when the breakpoint is encountered and the condition is met.

In one embodiment, the tools and techniques can include a debugger stepping through target code in a computer program. The debugger can identify a coroutine yield point in the target code, and can obtain identifying information to identify continued processing of a coroutine instance triggered by the yield point. The debugger can set a breakpoint at a location for continued stepping after the yield point. The breakpoint can have a condition of matching the identifying information with runtime information. The debugger can perform the coroutine instance and resume execution of the target code after the yield point. The debugger can also encounter the breakpoint in the target code, and can determine whether the condition of the breakpoint is met. If so, the debugger can pause execution of the target code at the breakpoint. If not, the debugger can continue execution of the target code past the breakpoint without pausing at the breakpoint.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved debugging behavior when stepping through target code that includes a coroutine yield point. Such improvements may result from the use of various techniques and tools separately or in combination.

Such techniques and tools may include a debugger deciding to step over a coroutine yield point such as an asynchronous wait operation. For the sake of simplicity, an asynchronous wait operator and corresponding asynchronous wait operation will be described throughout this detailed description. However, the techniques and tools described herein can apply to other types of yield points and other types of coroutines. The debugger can perform the step-over operation by setting and using an identifying conditional breakpoint. Specifically, the debugger can set an identifying breakpoint at a location for continued stepping after execution of the asynchronous wait operation. Such a breakpoint can be conditional on the runtime information matching an identity condition for a callback instance corresponding to the asynchronous wait operation instance. When the breakpoint is encountered and the condition is met, the debugger can pause, and stepping can continue from that point.

In this way, the debugger can follow the logic of the code by stepping over an asynchronous wait operator as if it were synchronous code. This can be done without a user manually setting a breakpoint, which can be tedious and time-consuming. Additionally, the stepping can continue in the matching callback instance because the debugger can use the identifying information to set the condition of the identifying breakpoint to identify that callback instance.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

Figure 1:
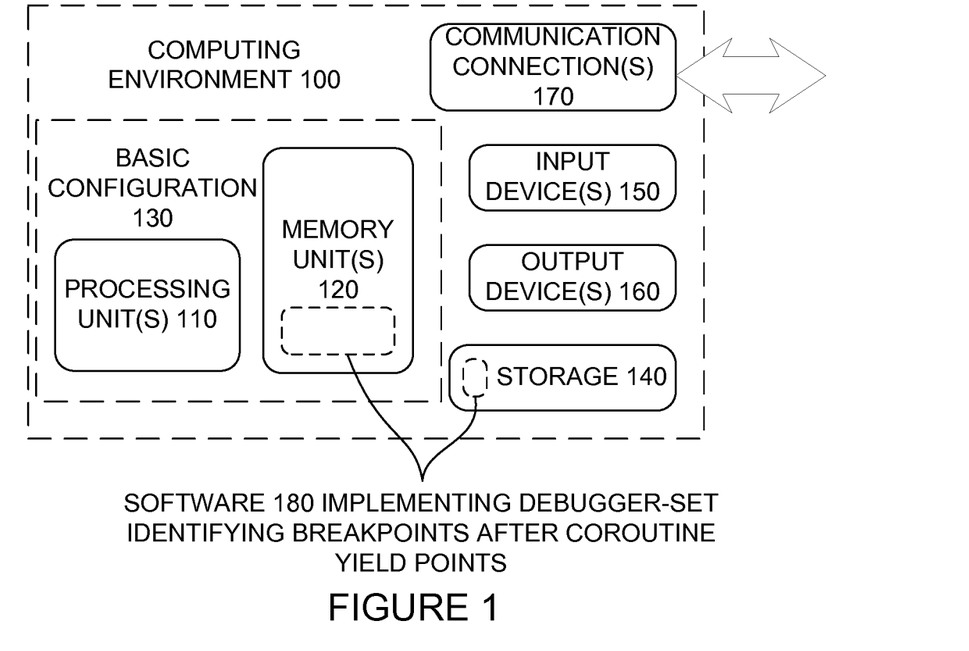
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a runtime environment and/or an environment for running a debugger. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and at least one memory unit (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory unit(s) (120) may be volatile memory (e.g., registers, cache, RAM), non-volatile memory (e.g., ROM, EEPROM, flash memory), or some combination of the two. The memory unit(s) (120) store software (180) implementing debugger-set identifying breakpoints after coroutine yield points.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to signals per se. By way of example, and not limitation, with the computing environment (100), computer-readable storage media include memory unit(s) (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "execute," and "pause" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Debugging System and Environment

Figure 2:
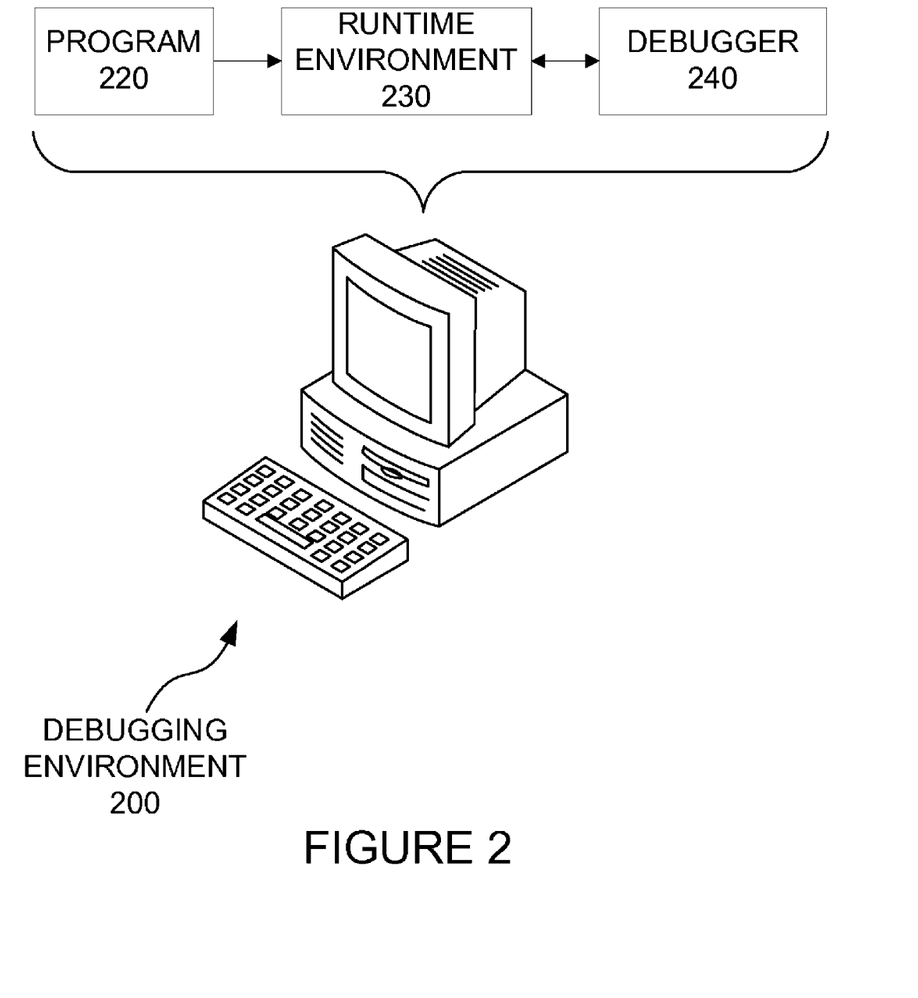
FIG. 2 is a schematic diagram of a debugging environment.

FIG. 2 is a block diagram of a debugging environment (200) in conjunction with which one or more of the described embodiments may be implemented. The debugging environment (200) can include a computer program (220) to be debugged. The program (220) can be submitted to a runtime environment (230), which can prepare the program (220) to be executed, and can execute the program (220) as directed by a debugger (240). The program (220) may be any of various different types of programs. For example, the program (220) may be in the form of source code, and the runtime environment (230) can include a compiler for compiling the code into executable form. As another example, the code of the program (220) may include one or more scripts, and the runtime environment (230) can include a translator for translating the scripts into executable form. As yet another example, the program (220) may be in an executable format, such as binary object code. Moreover, the program (220) may include combinations of such forms of code, or other forms of code that can be executed by a computing environment, possibly after being transformed in some manner (compiled, translated, etc.).

The debugger (240) can step through the code of the program (220), invoking the runtime environment (230) to run code in the program (220) between steps, and pausing at each step. For example, the debugger (240) may pause execution of the program (220) by the runtime environment (230) to allow for analysis of the runtime environment and/or to receive user input.

In doing such debugging, the debugger (240) may follow the physical flow or execution of the program (220). The debugger (240) can do this by stepping through the program (220) so that it appears to a user that the debugger (240) is following the path of the code portions that would be physically executing in the runtime environment (230) when running the program (220). Alternatively, the debugger (240) may follow a logical flow of the program (220). The debugger (240) can do this by stepping through the program (220) so that it appears to a user that the debugger (240) is following the path of logical flow of the program (220). For example, the debugger (240) may pause at areas that make it appear to the user that the debugger (240) is following a particular target process to its completion, even if an asynchronous wait operator would have returned physical execution to a process that called the target process before the target process was complete. Accordingly, the calling process and possibly other processes could be physically executing while the target process is in a waiting state (e.g., waiting for the callback for an asynchronous wait operator to be called). The logical flow of the target process could be followed in this example by "stepping over" the asynchronous operator. This can be done by executing the resulting asynchronous operation and then pausing in the target code after the asynchronous operation is complete, rather than stepping in the calling process when the asynchronous wait operation returns physical execution back to that calling process. More details of how the debugging environment (200) can perform this "stepping over" behavior will now be provided.

The debugger (240) can recognize an asynchronous wait operator in the program (220). For example, the debugger (240) may be configured to recognize patterns in the program (220) that indicate asynchronous wait operators. As another example, a compiler in the runtime environment (230) can recognize such patterns and can emit extra information into a program database file. The extra information can include locations for asynchronous wait operators in the program (220). The extra information can also include locations for continuing stepping after each asynchronous wait operator (e.g., the place in the target code where execution continues after the callback function associated with the asynchronous wait operation is called), as well as an identification of what runtime information can be used to identify a particular instance of the asynchronous wait operation. For example, such identifying information could include a particular uniform resource locator (URL) that identifies a computer network resource that is to be returned when the callback function for the asynchronous wait is called. As another example, where information about a particular customer is being processed, an identifier for that customer could be used as the identifying information.

As one example of specifying the locations, where the Microsoft® Intermediate Language (MSIL) is used, the MSIL offset locations of the asynchronous wait operations and of the locations for continued processing after such operations may be specified by a compiler in the runtime environment (230). Alternatively, the locations could be specified in object code, source code, scripts, etc.

Where the runtime environment provides extra information as discussed above, the debugger (240) can load the extra information. For example, this loading can be done by loading a program database file, and using the locations of asynchronous wait operators to determine when an asynchronous wait operation can be stepped over. When such a step-over operation is to be performed, the debugger (240) can set a condition breakpoint at the corresponding location for continuing stepping. The conditional breakpoint can be an identifying breakpoint in that the breakpoint can be conditional on the runtime information matching the identifying information for the asynchronous wait instance (such as where the matching callback instance is called).

The runtime information that matches the identifying information for the identifying breakpoint can be formatted and stored in various ways. For example, with the C#® and Visual Basic® languages, an instance-specific state object (i.e., an object that is specific to an instance of an operation, method, etc. and stores state information about the instance), typically referred to as a state machine object in the context of those languages, can be created with the invocation of an asynchronous method. This state machine object typically stores information on where to pick up when the callback function for the asynchronous method is called. The debugger (240) can access that object, and use the information in the object to set the conditional breakpoint. When the breakpoint is later encountered, the debugger (240) can evaluate the condition of the breakpoint by determining whether the current runtime information in the state machine object matches the condition of the breakpoint. If so, then the debugger (240) can pause at the breakpoint. If not, then the debugger (240) can continue execution without pausing at the breakpoint.

In an example for the F# language, when an asynchronous operation executes, a place can be provided to store data pertaining to the particular execution of the asynchronous operation (i.e, the particular instance of the operation). The storage can be somewhat similar to thread-local storage, but it can be for implicit asynchronous logical threads for execution. For example, this storage may be used to store a cancellation token associated with a particular asynchronous operation instance. The storage can be modified to store information (e.g., a "token") for logical thread identity. The token can be used to set the identifying breakpoint and to check matches of the breakpoint similarly to using the state machine objects, as discussed above.

When the condition of an identifying breakpoint has been matched, the debugger (240) can remove the breakpoint. This can avoid confusion if multiple instances of an asynchronous operation are being performed. The debugger (240) may only allow one asynchronous step-over operation at a time to avoid such confusion. However, in other situations, a user may want to allow multiple asynchronous step-over operations at the same time. Accordingly, user input could be used to determine how many asynchronous step-over operations to allow at one time.

The debugger (240) could also clear identifying breakpoints in other situations. For example, if user input instructed the debugger (240) to stop the program at a particular point, it may be advantageous for the debugger (240) to clear all the identifying breakpoints for asynchronous wait operations at that time. Similar clearing of identifying breakpoints could be triggered by other events, such as the debugger (240) pausing at another breakpoint, or the program throwing an exception.

III. Techniques for Debugger-Set Identifying Breakpoints After Coroutine Yield Points Several techniques for debugger-set identifying breakpoints after coroutine yield points such as asynchronous wait operators will now be discussed. Each of these techniques can be performed in a computing environment. For example, each technique may be performed in a computer system that includes at least one processing unit and at least one memory unit including instructions stored thereon that when executed by the processing unit(s) cause the processing unit(s) to perform the technique (one or more memories store instructions (e.g., object code), and when the processing unit(s) execute(s) those instructions, the processing unit(s) perform(s) the technique). Similarly, one or more computer-readable storage media may have computer-executable instructions embodied thereon that, when executed by at least one processing unit, cause the processing unit(s) to perform the technique.

Figure 3:
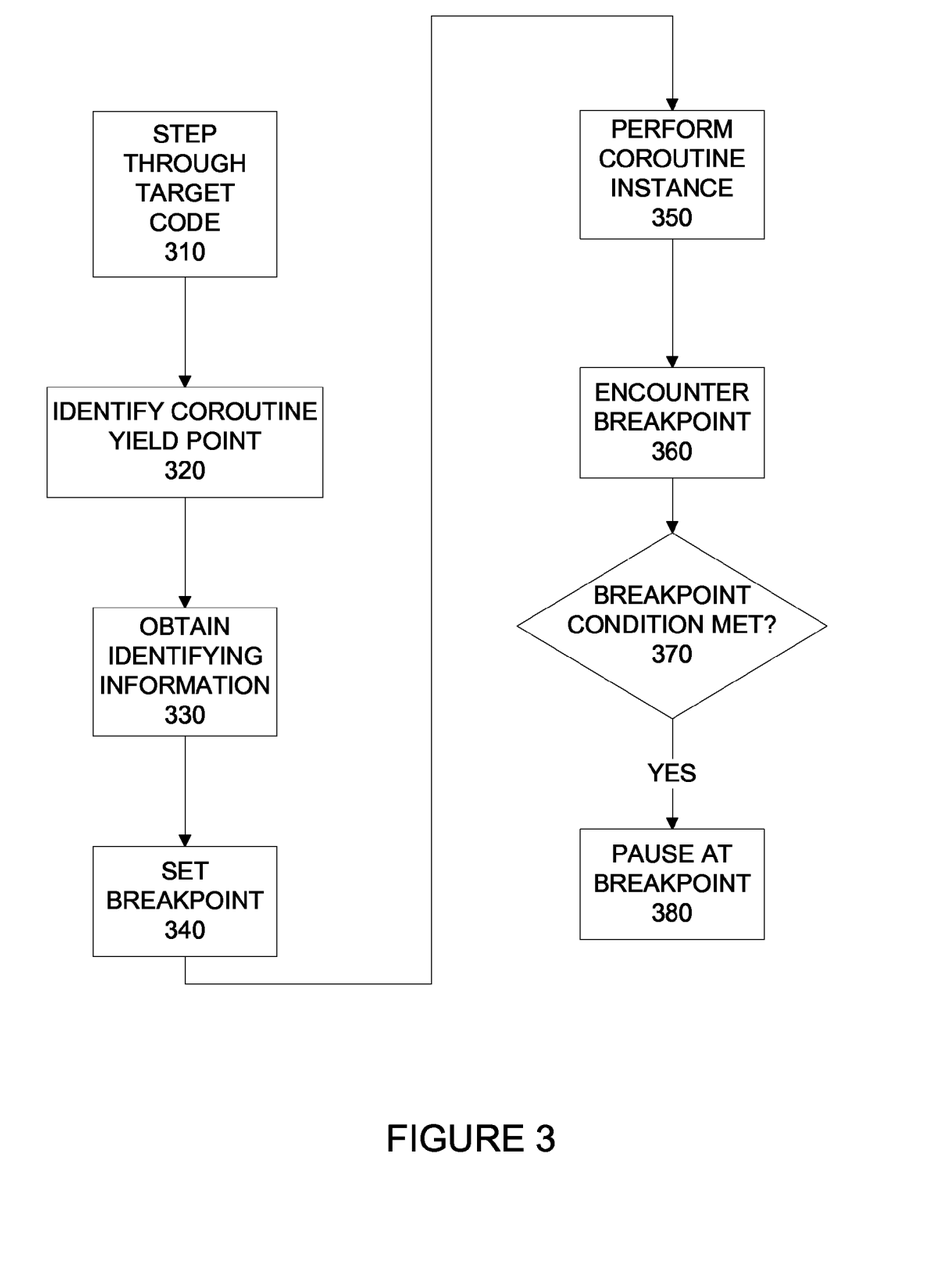
FIG. 3 is a flowchart of a technique for debugger-set identifying breakpoints after coroutine yield points.

Referring to FIG. 3, a technique for debugger-set identifying breakpoints after coroutine yield points (e.g., asynchronous wait operators) will be described. The technique can include a debugger stepping (310) through target code in a computer program. The debugger can identify (320) a coroutine yield point in the target code, obtain (330) identifying information to identify continued processing of a coroutine instance (e.g., an asynchronous wait operation instance) triggered by the coroutine yield point, and set (340) a breakpoint having a condition of matching the identifying information with runtime information. For example, the identifying information may be included in an instance-specific state object, and the instance-specific state object may also include the runtime information. The breakpoint can be set (340) at a location for continued stepping after the coroutine yield point, such as a location for continued execution after a callback for the coroutine is called. Additionally, the debugger can perform (350) the coroutine instance and resume executing the target code after the coroutine yield point. The debugger can encounter (360) the breakpoint in the target code and determine (370) whether the condition of the breakpoint is met. If so, the debugger can pause (380) execution of the target code at the breakpoint.

The technique of FIG. 3 may include the debugger continuing execution of the target code past the breakpoint without pausing at the breakpoint if the condition of the breakpoint is not met. Also, the debugger's identification of the coroutine yield point in the target code can include the debugger receiving location information for the coroutine yield point from a runtime environment of the program. The runtime environment may also inform the debugger of the location for continued stepping after the coroutine yield point. For example, the runtime environment may include a compiler or translator, and the debugger can receive the location information for the coroutine yield point from the compiler or translator. The debugger may execute the coroutine instance without the debugger pausing execution during the execution of the coroutine instance, although there may be natural pauses in the program's execution that are not part of the debugger's stepping pauses.

The technique of FIG. 3 may include the debugger clearing one or more identifying breakpoints in the program when a predetermined event occurs while debugging the program. For example, the debugger could be configured to recognize such an event and to take actions to clear the identifying breakpoint(s). The predetermined event may be one of various events, such as an event selected from a group consisting of user input instructing the debugger to stop the program, the debugger pausing at a breakpoint, and the program throwing an exception.

Figure 4:
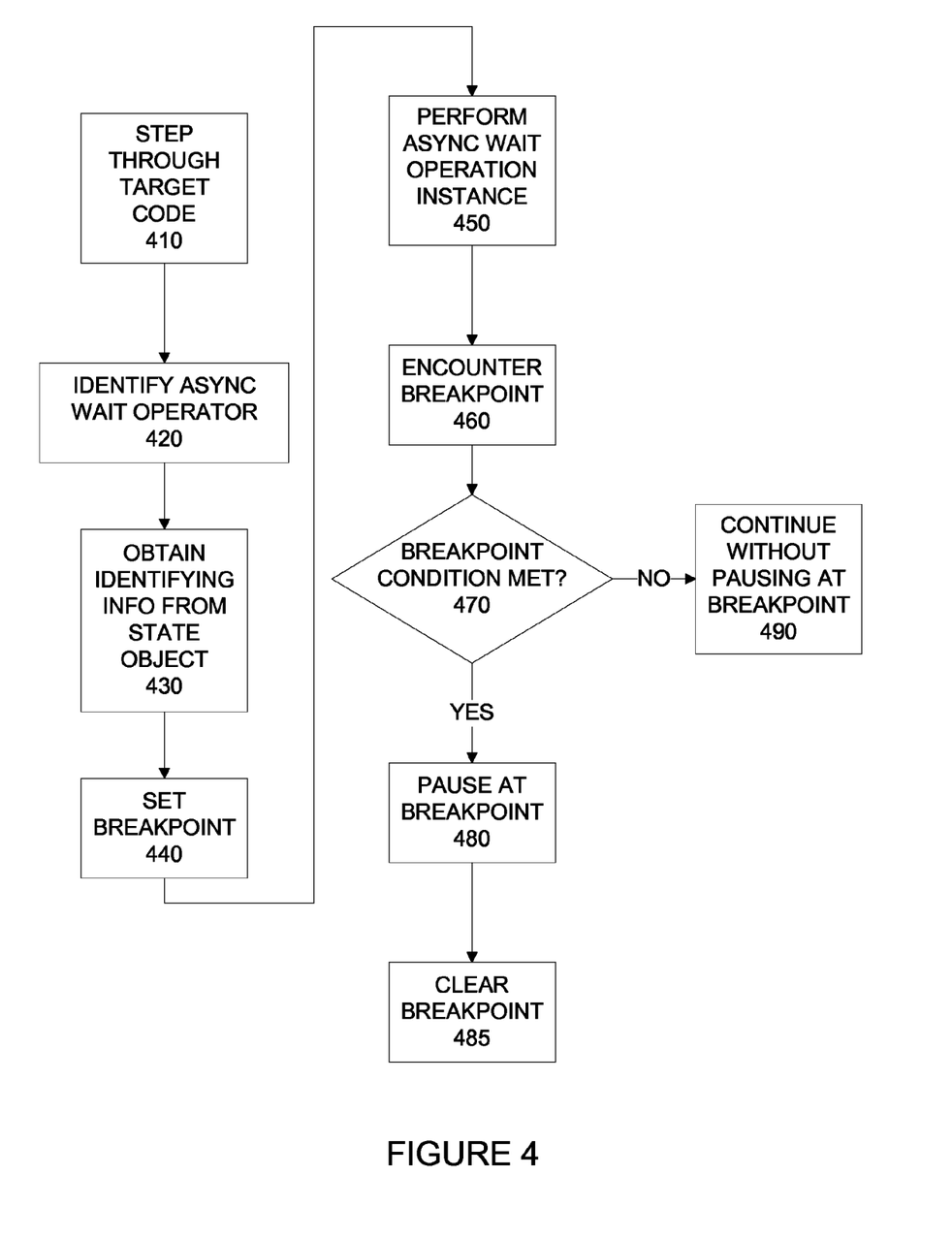
FIG. 4 is a flowchart of another technique for debugger-set identifying breakpoints after asynchronous wait operators.

Referring to FIG. 4, another technique for debugger-set identifying breakpoints after asynchronous wait operators or other coroutine yield points will be described. The technique of FIG. 4 may be performed by invoking a debugger to perform the technique. For example, the technique can include stepping (410) through target code in a computer program. The technique can also include identifying (420) an asynchronous wait operator or other coroutine yield point in the target code, such as by using location information from a compiler of the computer program. Additionally, identifying information can be obtained (430) from an instance-specific state object, to identify continued processing of an asynchronous wait operation instance or other coroutine instance triggered by the asynchronous wait operator. A breakpoint can be set (440) at a location for continued stepping after the asynchronous wait operation. The breakpoint can have a condition of matching the identifying information with runtime information. The asynchronous wait operation can be performed (450) and execution of the target code can be resumed. The breakpoint can be encountered (460) in the target code, and it can be determined (470) whether the condition of the breakpoint is met. For example, this may include evaluating the instance-specific state object in runtime information. If so, then execution of the target code can be paused (480) at the breakpoint if the condition of the breakpoint is met. Additionally, the breakpoint can be cleared (485) after pausing (480) execution of the target code at the breakpoint. If the condition of the breakpoint is not met, then execution of the target code can continue (490) past the breakpoint without pausing at the breakpoint.

The technique can include the debugger receiving from the compiler the location for continued stepping after the asynchronous wait operator. Also, the debugger may perform the asynchronous wait operation instance without pausing during execution of the asynchronous wait operation instance. Moreover, the technique may include clearing all identifying breakpoints in the program when a predetermined event occurs while debugging the program.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
   a debugger stepping through target code in a computer program;
   the debugger identifying a coroutine yield point in the target code, the coroutine yield point comprising an instruction to call a coroutine and to continue processing after the coroutine yield point in the target code when processing is returned to the target code as a result of execution of the coroutine called by the coroutine yield point;
   the debugger obtaining identifying information to identify continued processing after the coroutine yield point in the target code when processing is returned to the target code as a result of execution of a coroutine instance outside the target code, the execution of the coroutine instance resulting from the coroutine instance being called by the coroutine yield point;
   the debugger setting a breakpoint having a condition of matching the identifying information with runtime information, the breakpoint being set at a location in the target code for continued stepping after the coroutine yield point, and the breakpoint being different from the coroutine yield point;
   the debugger performing the coroutine instance and resuming executing the target code after the coroutine yield point;
   the debugger encountering the breakpoint in the target code;
   the debugger determining whether the condition of the breakpoint is met; and
   the debugger pausing execution of the target code at the breakpoint if the condition of the breakpoint is met.

2. The method of claim 1, wherein the coroutine yield point is an asynchronous wait operator, and wherein the coroutine instance is an asynchronous wait operation instance.

3. The method of claim 1, further comprising the debugger continuing execution of the target code past the breakpoint without pausing at the breakpoint if the condition of the breakpoint is not met.

4. The method of claim 1, wherein an instance-specific state object comprises the identifying information.

5. The method of claim 1, further comprising clearing the breakpoint after pausing execution of the program at the breakpoint.

6. The method of claim 1, wherein the debugger identifying the coroutine yield point in the target code comprises the debugger receiving location information for the coroutine yield point from a runtime environment of the program.

7. The method of claim 6, wherein the runtime environment informs the debugger of the location for continued stepping after the coroutine yield point.

8. The method of claim 6, wherein the runtime environment comprises a compiler, and wherein the debugger receives the location information for the coroutine yield point from the compiler.

9. The method of claim 6, wherein the runtime environment comprises a translator, and wherein the debugger receives the location information for the coroutine yield point from the translator.

10. The method of claim 1, wherein the debugger executes the coroutine instance without the debugger pausing execution during the execution of the coroutine instance.

11. The method of claim 1, further comprising the debugger clearing one or more identifying breakpoints in the program when a predetermined event occurs while debugging the program.

12. A computer system comprising:
   at least one processing unit; and
   at least one memory unit comprising instructions stored thereon that when executed by the at least one processing unit cause a debugger to perform acts comprising:
      stepping through target code in a computer program;
      identifying an asynchronous wait operator in the target code for calling an asynchronous wait operation instance, and for continuing processing after the asynchronous wait operator in the target code when processing is returned to the target code as a result of execution of the wait operation instance called by the asynchronous wait operator;
      obtaining identifying information to identify continued processing after the wait operator in the target code when processing is returned to the target code as a result of execution of the asynchronous wait operation instance outside the target code, the execution of the wait operation instance resulting from the wait operation instance being called by the asynchronous wait operator;
      setting a breakpoint having a condition of matching the identifying information with runtime information, the breakpoint being set at a location in the target code for continued stepping after the asynchronous wait operator, and the breakpoint being different from the asynchronous wait operator;
      performing the asynchronous wait operation instance and resuming executing the target code;
      encountering the breakpoint in the target code;
      determining whether the condition of the breakpoint is met;
      if the condition of the breakpoint is met, then pausing execution of the target code at the breakpoint and clearing the breakpoint; and
      if the condition of the breakpoint is not met, then continuing execution of the target code past the breakpoint without pausing at the breakpoint.

13. The computer system of claim 12, wherein an instance-specific state object comprises the identifying information.

14. The computer system of claim 12, wherein identifying the asynchronous wait operation in the target code comprises the debugger receiving location information for the asynchronous wait operator from a runtime environment of the program.

15. The computer system of claim 14, wherein the runtime environment informs the debugger of the location for continued stepping after the asynchronous wait operator.

16. The computer system of claim 12, wherein the debugger executes the asynchronous wait operation instance without the debugger pausing during execution of the asynchronous wait operation.

17. One or more computer-readable storage media having computer-executable instructions embodied thereon that, when executed by at least one processing unit, cause the at least one processing unit to invoke a debugger to perform acts comprising:
   stepping through target code in a computer program;
   identifying an asynchronous wait operator in the target code;
   obtaining identifying information to identify continued processing after the wait operator in the target code when processing is returned to the target code as a result of execution of an asynchronous wait operation instance outside the target code, the execution of the wait operation instance resulting from the wait operation instance being called by the asynchronous wait operator;

setting a breakpoint having a condition of matching the identifying information with runtime information, the breakpoint being set at a location in the target code for continued stepping after the asynchronous wait operation, and the breakpoint being different from the asynchronous wait operator;

performing the asynchronous wait operation and resuming executing the target code;

encountering the breakpoint in the target code;

determining whether the condition of the breakpoint is met;

pausing execution of the target code at the breakpoint if the condition of the breakpoint is met; and continuing execution of the target code past the breakpoint without pausing at the breakpoint if the condition of the breakpoint is not met.

18. The one or more computer-readable storage media of claim 17, wherein, if the condition of the breakpoint is met, the acts further comprise clearing the breakpoint after pausing execution of the target code at the breakpoint.

19. The one or more computer-readable storage media of claim 17, wherein the acts comprise the debugger receiving from a compiler the location for continued stepping after the asynchronous wait operator.

20. The one or more computer-readable storage media of claim 17, wherein the acts comprise the debugger performing the asynchronous wait operation instance without pausing during execution of the asynchronous wait operation instance.

* * * * *